(12) United States Patent
Tanaka

(10) Patent No.: US 7,130,148 B2
(45) Date of Patent: Oct. 31, 2006

(54) MAGNETIC TAPE CARTRIDGE LIBRARY APPARATUS HAVING VERTICALLY ORIENTED STAGES

(75) Inventor: Atsushi Tanaka, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/245,010

(22) Filed: Oct. 7, 2005

(65) Prior Publication Data

US 2006/0028757 A1 Feb. 9, 2006

Related U.S. Application Data

(62) Division of application No. 10/326,401, filed on Dec. 23, 2002, now abandoned.

(30) Foreign Application Priority Data

Dec. 25, 2001 (JP) ............... 2001-392394

(51) Int. Cl.
*G11B 15/68* (2006.01)
(52) U.S. Cl. ..................... 360/92; 369/30.67
(58) Field of Classification Search ............... None
See application file for complete search history.

(56) References Cited

U.S. PATENT DOCUMENTS

| | | | | |
|---|---|---|---|---|
| 5,050,020 | A * | 9/1991 | Campbell et al. | 360/92 |
| 6,041,026 | A | 3/2000 | Hammar et al. | 369/30.43 |
| 6,222,699 | B1 | 4/2001 | Luffel et al. | 360/92 |
| 6,229,667 | B1 | 5/2001 | Ostwald | 360/92 |
| 6,848,114 | B1 * | 1/2005 | Mueller et al. | 720/647 |

| | | | |
|---|---|---|---|
| 2001/0013990 | A1 | 8/2001 | Ostwald et al. ............... 360/92 |

FOREIGN PATENT DOCUMENTS

| | | |
|---|---|---|
| JP | 54-137306 | 10/1979 |
| JP | 1-285056 | 11/1989 |
| JP | 6-150494 | 5/1994 |
| JP | 11-296955 | 10/1999 |
| JP | 2000-276828 | 10/2000 |
| WO | WO 01/09888 A1 | 2/2001 |

OTHER PUBLICATIONS

Japanese Office Action dated Nov. 4, 2003 with a partial English translation.
Japanese Office Action dated May 11, 2004 with a partial English translation.

* cited by examiner

*Primary Examiner*—David Davis
(74) *Attorney, Agent, or Firm*—McGinn IP Law Group, PLLC

(57) ABSTRACT

The invention provides a magnetic tape cartridge library apparatus wherein the space can be utilized effectively to allow accommodation of an increased number of tape cartridges. The magnetic tape cartridge library apparatus includes a cartridge magazine for removably accommodating a plurality of magnetic tape cartridges in a plurality of stages in a vertical direction therein, a magnetic tape deck for reading or writing data from or onto a magnetic tape cartridge loaded therein, a hand apparatus disposed on the front side of the magnetic tape deck, and a magazine feeding mechanism for feeding the cartridge magazine forwardly or rearwardly on one of the left and right sides of the hand apparatus. The hand apparatus is operable to insert or take out a magnetic tape cartridge into or from the cartridge magazine and transport the magnetic tape cartridge between the cartridge magazine and the magnetic tape deck.

12 Claims, 9 Drawing Sheets

MAGNETIC TAPE CARTRIDGE LIBRARY APPARATUS HAVING VERTICALLY ORIENTED STAGES

The present Application is a Divisional Application of U.S. patent application Ser. No. 10/326,401, filed on Dec. 23, 2002 now abandoned.

BACKGROUND OF THE INVENTION

1. Field of the Invention

The present invention relates to a magnetic tape library apparatus, and more particularly to a magnetic tape library apparatus which includes a movable cartridge magazine.

2. Description of the Related Art

A magnetic tape cartridge library apparatus (hereinafter referred to merely as tape library apparatus) is conventionally known which includes a magnetic recording and reproduction apparatus (hereinafter referred to merely as tape deck) which performs recording and reproduction processes onto and from a magnetic tape medium (hereinafter referred to merely as magnetic tape) and an automatic recording medium loading apparatus which automatically loads and unloads such a recording medium as a magnetic tape cartridge (hereinafter referred to merely as tape cartridge) into and from the magnetic recording and reproduction apparatus by means of a hand apparatus. However, where the hand apparatus is provided on the front side of the magnetic tape deck (hereinafter referred to merely as tape deck), even if a free space can be provided on the opposite left and right sides of the tape deck, the free spaces on the opposite left and right sides of the tape deck cannot be used for accommodation of cartridges because the hand apparatus cannot advance into the free spaces.

FIG. 9 shows an example of a conventional automatic recording medium loading apparatus disclosed in Japanese Patent Laid-Open No. 276828/2000. Referring to FIG. 9, the automatic recording medium loading apparatus 100 shown includes a recording and reproduction apparatus (tape deck) 103 for performing a recording process and a reproduction process into and from a tape cassette 102 loaded in an apparatus body 101 thereof, a cassette accommodating rack 104 for accommodating a plurality of tape cassettes 102 in parallel to each other in a vertical posture at the same height therein, a box-shaped rack case 106 for fixedly accommodating the cassette accommodating rack 104 therein, a table 109 having the rack case 106 placed thereon, a rack feeding mechanism 110 for feeding the table 109 leftwardly and rightwardly in front of the recording and reproduction apparatus (tape deck) 103, and a loading mechanism 105 for transporting a tape cassette 102 between the cassette accommodating rack 104 and the recording and reproduction apparatus 103. The cassette accommodating rack 104 is disposed integrally with the recording and reproduction apparatus 103.

In the automatic recording medium loading apparatus 100, a tape cassette 102 can be transported directly from the recording and reproduction apparatus 103 to the cassette accommodating rack 104. Consequently, the space required for transportation of a tape cassette 102 is small, and the automatic recording medium loading apparatus can be formed with a small size and the time required for the transportation can be reduced.

In the conventional automatic recording medium loading apparatus 100, however, since a plurality of tape cassettes 102 are accommodated in parallel to each other in a vertical posture at the same height in the cassette accommodating rack 104 and the cassette accommodating rack 104 is fed leftwardly and rightwardly together with the rack case 106 to effect exchange of a tape cassette 102, the number of tape cassettes 102 which can be accommodated in the cassette accommodating rack 104 is limited, and a great number of tape cassettes cannot be handled.

SUMMARY OF THE INVENTION

It is an object of the present invention to provide a magnetic tape cartridge library apparatus wherein the space can be utilized effectively to allow accommodation of an increased number of tape cartridges.

In order to attain the object described above, according to the present invention, there is provided a magnetic tape cartridge library apparatus, comprising a cartridge magazine for removably accommodating a plurality of magnetic tape cartridges in a plurality of stages in a vertical direction therein, a magnetic tape deck for reading or writing data from or onto a magnetic tape cartridge loaded therein, a hand apparatus disposed on the front side of the magnetic tape deck, and a magazine feeding mechanism for feeding the cartridge magazine forwardly or rearwardly on one of the left and right sides of the hand apparatus, the hand apparatus being operable to insert or take out a magnetic tape cartridge into or from the cartridge magazine and transport the magnetic tape cartridge between the cartridge magazine and the magnetic tape deck.

Preferably, the magnetic tape cartridge library apparatus further comprises an additional cartridge magazine, and an additional magazine feeding mechanism for transporting a magnetic tape cartridge between the additional cartridge magazine and the magnetic tape deck, the two cartridge magazines being disposed on the opposite left and right sides of the hand apparatus. The magnetic tape cartridge library apparatus may further comprise a second additional cartridge magazine disposed on the front side of the hand apparatus.

The cartridge magazine may have a plurality of slots formed therein each for removably receiving a magnetic tape cartridge in a horizontal posture, the slots being disposed in a plurality of stages in a vertical direction and in a plurality of rows along a direction along which the magazine feeding mechanism feeds the magnetic cartridge magazine. The slots of the cartridge magazine may have a plurality of different sizes so that magnetic tape cartridges of different sizes may be accommodated in the cartridge magazine.

The hand apparatus may include a picker apparatus for grasping and removably inserting a magnetic tape cartridge into the cartridge magazine and loading the magnetic tape cartridge into the magnetic tape deck, a lifter mechanism for moving the picker apparatus upwardly and downwardly, and a swiveling mechanism for changing the direction of the magnetic tape cartridge grasped by the picker apparatus.

The magazine feeding mechanism may feed the cartridge magazine forwardly or rearwardly along a rail. In this instance, the magazine feeding mechanism may include a toothed rack formed on a bottom portion of the cartridge magazine, a drive gear for meshing with the toothed rack, and a motor for rotating the drive gear, or may include a movable table movable forwardly and rearwardly along a rail with a cartridge magazine placed thereon and having a toothed rack provided at a bottom portion thereof, a drive gear for meshing with the toothed rack, and a motor for rotating the drive gear.

With the magnetic tape library apparatus, since the cartridge magazine for accommodating magnetic tape cartridges therein is disposed for movement forwardly and rearwardly at least on one of the opposite left and right sides of the hand apparatus, the space in the magnetic tape cartridge library apparatus can be made the most of, and therefore, the magnetic tape library apparatus can accommodate an increased number of tape cartridges therein.

Further, since tape cartridges are accommodated in a plurality of stages in a horizontal posture, the distance of feeding movement of the cartridge magazine can be reduced when compared with an alternative case wherein tape cartridges are accommodated in a vertical posture. Consequently, a mechanism for moving a tape cartridge in the forward or backward direction from the hand apparatus which transports a tape cartridge to the magnetic tape deck can be omitted.

It is to be noted that, where the present invention is applied, a space for moving the cartridge magazine is required. However, since the hand apparatus itself does not move but remains at a fixed position, tape cartridges can be accommodated not only in the spaces on the opposite sides of the tape deck but also in the space in front of the hand apparatus. This further increases the number of tape cartridges which can be accommodated.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
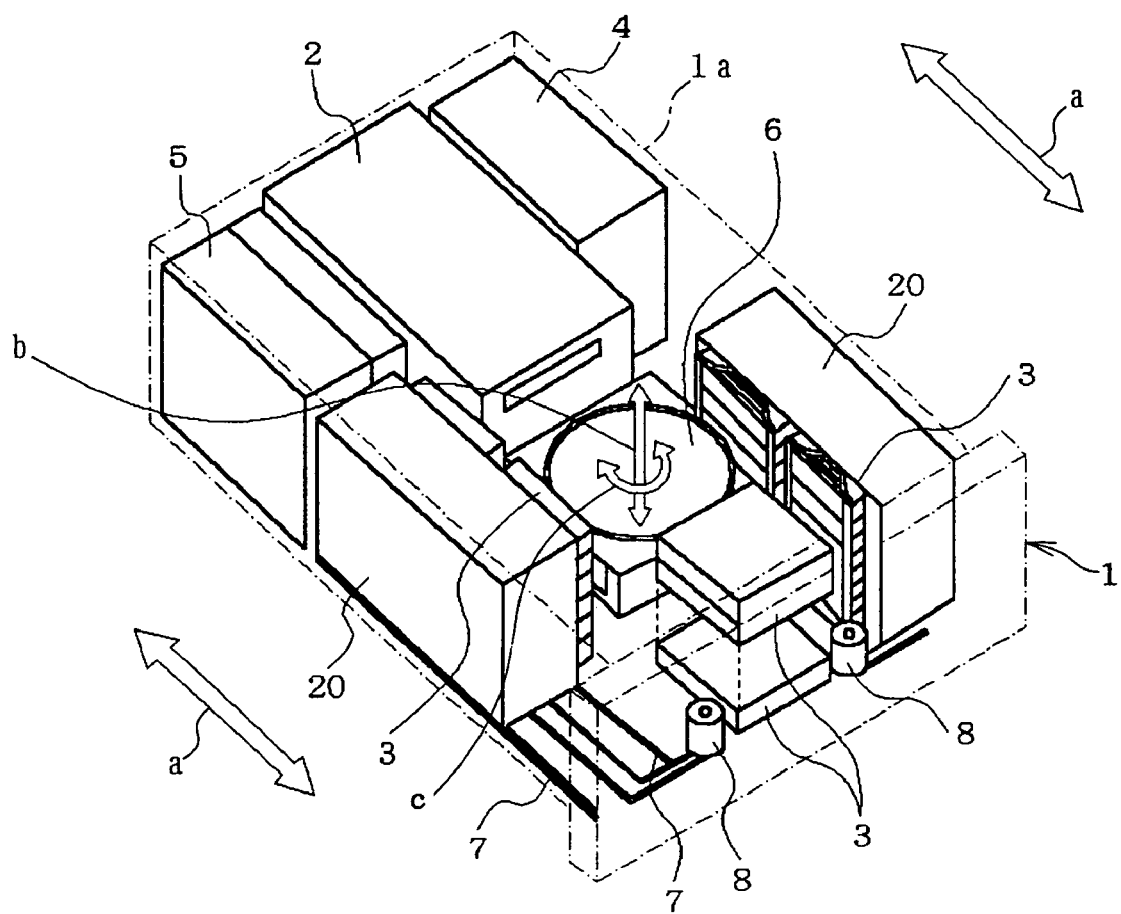
FIG. 1 is a perspective view as viewed from an obliquely upward position of a tape library apparatus to which the present invention is applied.
Figure 2:
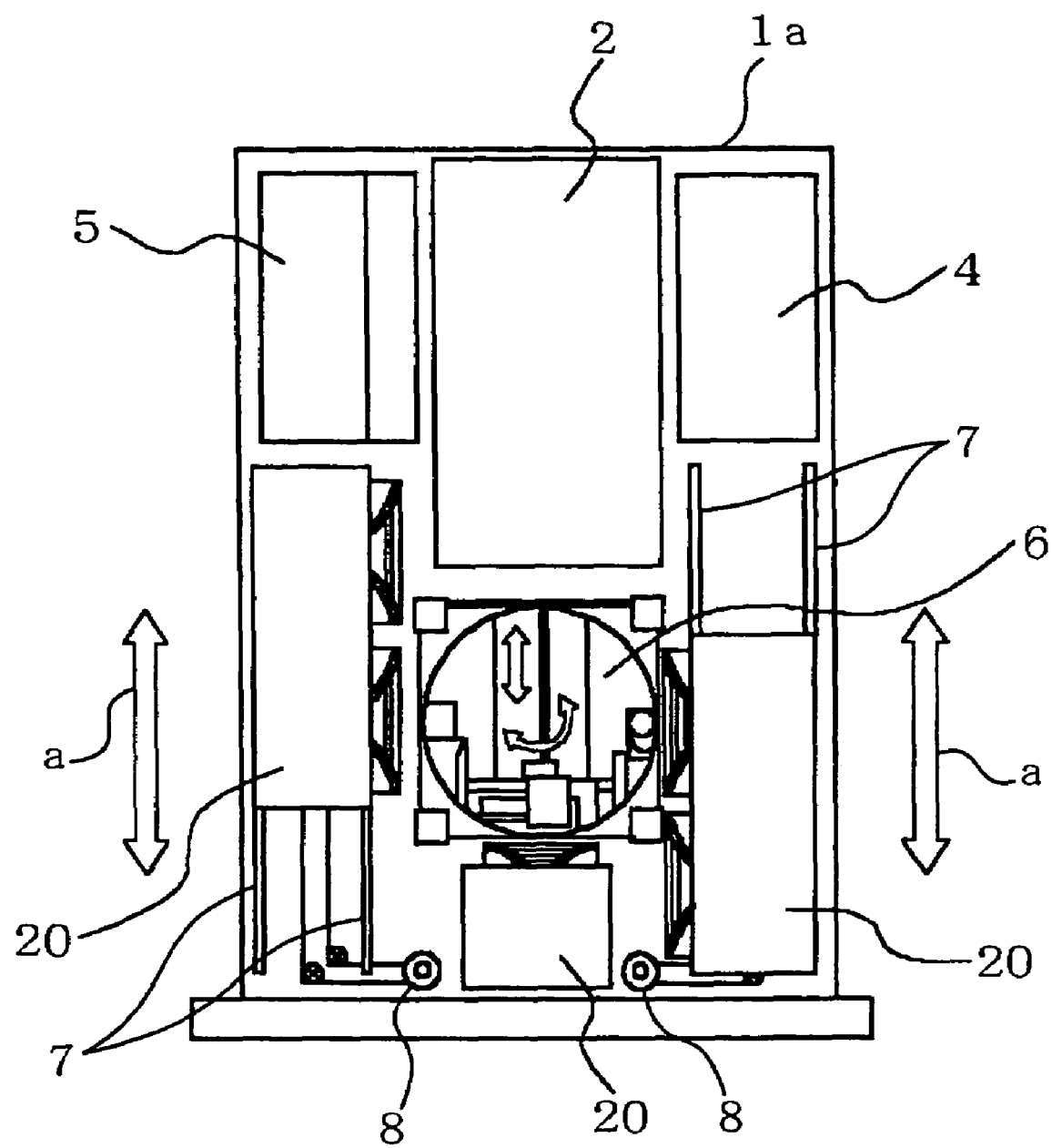
FIG. 2 is a top plan view of the tape library apparatus of FIG. 1.

Referring to FIGS. 1 and 2, there is shown a tape library apparatus to which the present invention is applied. The tape library apparatus 1 shown includes a housing 1a, and a tape deck 2 for reading and writing data from and onto a magnetic tape of a tape cartridge 3, a power supply 4 serving as a driving source, a control apparatus 5 for controlling operation of the tape library apparatus 1, a hand apparatus 6 and a pair of left and right cartridge magazines 20 all accommodated in the housing 1a.

The hand apparatus 6 is mounted on a bottom face of the housing 1a through a post not shown on the front side of the tape deck 2, and grasps a tape cartridge 3 and inserts and takes out it into and out of the tape deck 2 and the cartridge magazines 20.

The left and right cartridge magazines 20 are disposed for backward and forward movement on the bottom face of the housing 1a on the opposite left and right sides of the hand apparatus 6. Each of the cartridge magazines 20 is horizontally moved forwardly and backwardly as indicated by a double-sided arrow mark a in FIGS. 1 and 2 on and along two rails 7 laid on the bottom face of the housing 1a when a motor 8 is driven. The motors 8 are attached to the housing 1a each by means of a bracket not shown.

A plurality of slots 21 each for accommodating a tape cartridge 3 in a horizontal posture therein are formed in a plurality of stages in a vertical direction in two front and rear rows in each of the left and right cartridge magazines 20. Further, a toothed rack 22 is formed on a lower face of the bottom of each of the left and right cartridge magazines 20.

Also on the front side of the hand apparatus 6, a front side cartridge magazine 20 is disposed. The cartridge magazine 20 has a plurality slots formed in a plurality of stages in a vertical direction but in a row.

Figure 4:
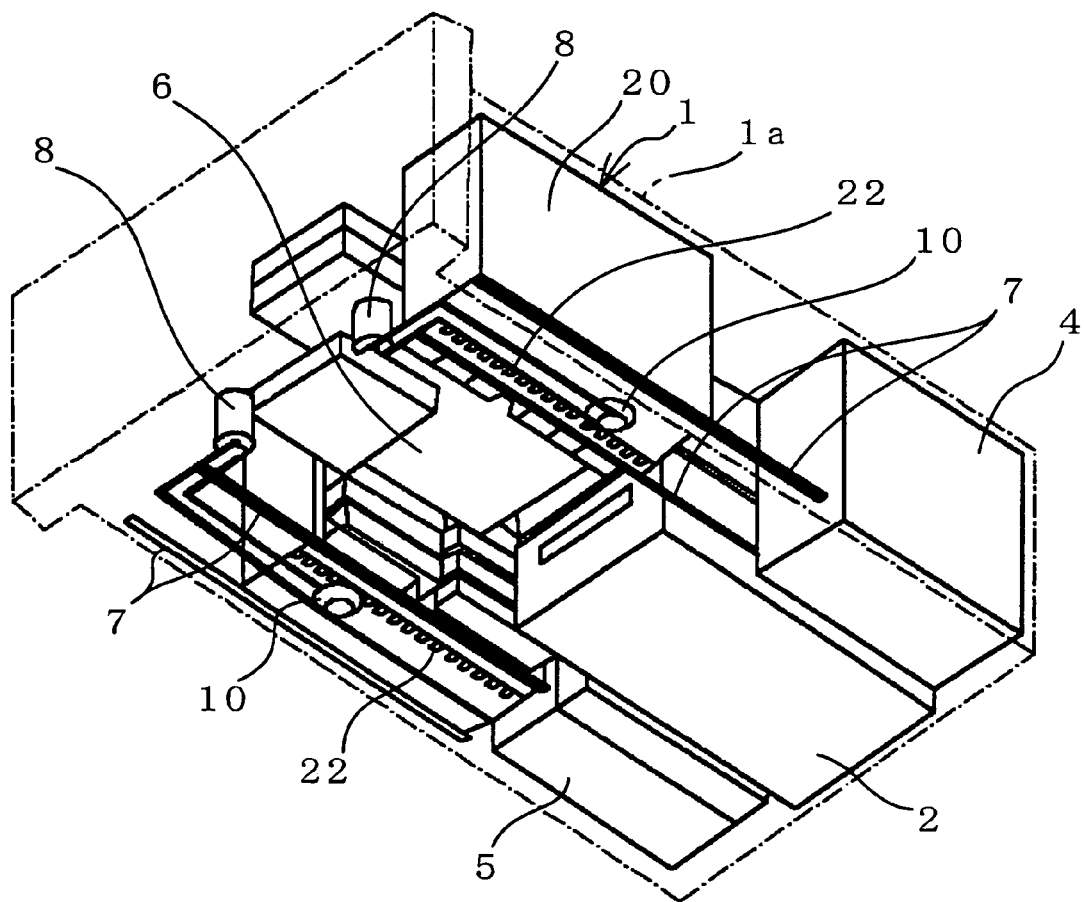
FIG. 4 is a perspective view as viewed from an obliquely downward position of the tape library apparatus of FIG. 1.
Figure 5:
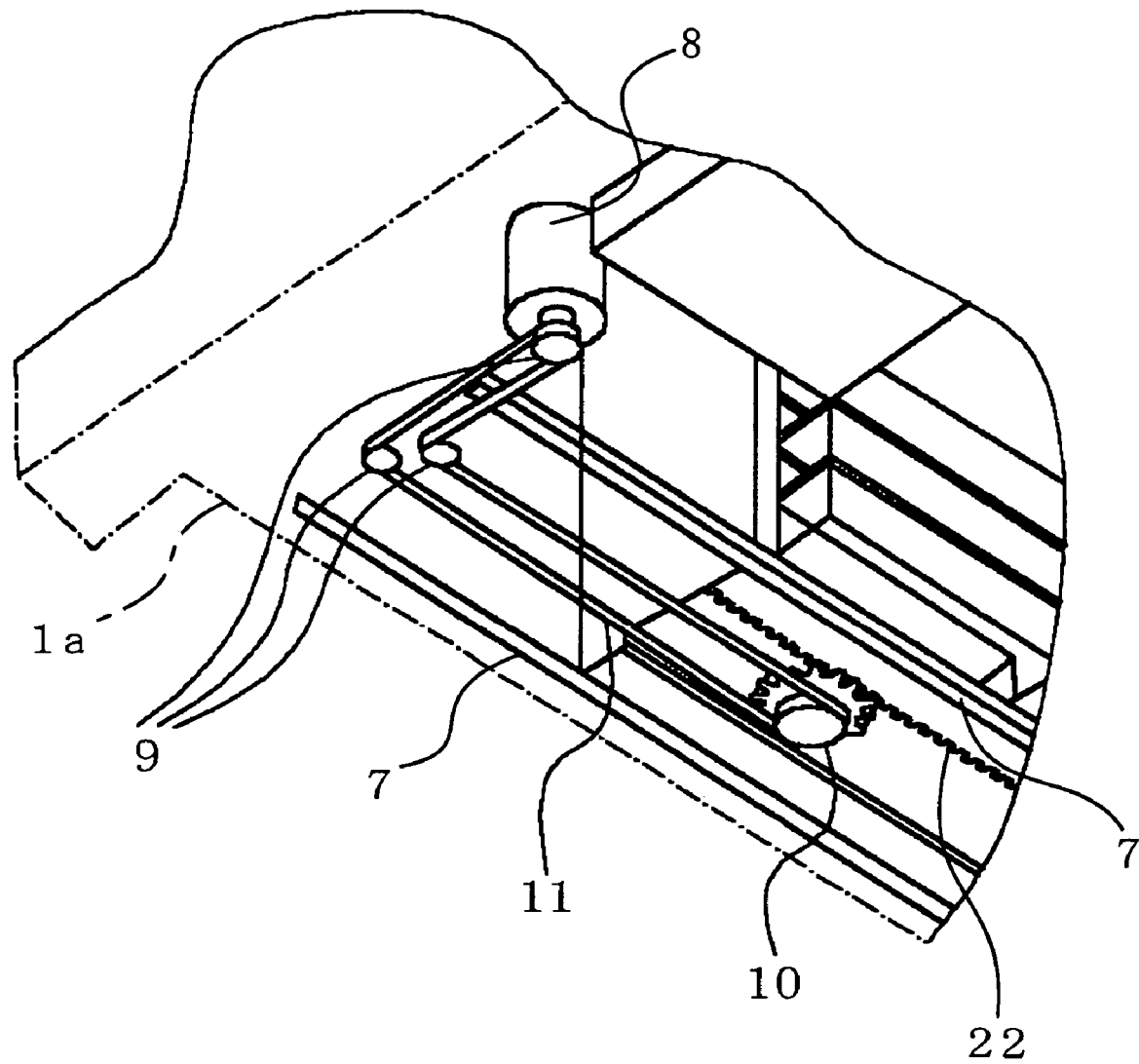
FIG. 5 is a partial enlarged view of the tape library apparatus shown in FIG. 4.

Referring to FIGS. 4 and 5, a pinion 10 and pulleys 9 for guiding a belt 11 are supported for rotation each by means of a shaft not shown on the bottom face of the housing 1a of the tape library apparatus 1. The pinion 10 serves as a drive gear which meshes with the toothed rack 22 of the cartridge magazine 20 for moving the cartridge magazine 20 forwardly and backwardly, and rotation of the motor 8 is transmitted to the pinion 10 through the belt 11.

The hand apparatus 6 includes three mechanisms not shown including a picker mechanism for grasping and removably inserting a tape cartridge 3 into any of the cartridge magazines 20 and loading the tape cartridge 3 into the tape deck 2, a lifter mechanism for moving the picker mechanism upwardly and downwardly as indicated by a double-sided arrow mark b in FIG. 1, and a swiveling mechanism for turning the direction of the tape cartridge 3 taken out by the picker mechanism as indicated by a double-sided arrow mark c together with the picker mechanism. The hand apparatus 6 having such a configuration as just described is known in the art, and an existing hand apparatus of the type described can be used as it is.

Now, operation of the tape library apparatus 1 is described.

Since the picker mechanism of the hand apparatus 6 is turned to a different direction by the swiveling mechanism and moved upwardly or downwardly by the lifter mechanism, while it remains at a fixed position, it can insert or takeout a tape cartridge 3 into or from any of the slots of the cartridge magazine 20 installed fixedly on the front side thereof. Meanwhile, with regard to each of the left and right cartridge magazines 20, the picker mechanism can insert or take out a tape cartridge 3 into or from any of the slots 21 in that one of the rows which is opposed to the picker mechanism.

In particular, since the driving of the left and right motors 8 is controlled separately from each other by the control apparatus 5, the left and right cartridge magazines 20 are horizontally fed forwardly and backwardly separately from each other as indicated by arrow marks a in FIG. 1 so that the two front and rear slots 21 of them can be switchably opposed to the hand apparatus 6 separately from each other. In FIG. 2, it is shown that the slots 21 in the front row of the left side cartridge magazine 20 are positioned such that a tape cartridge can be inserted into or taken out of any of them by the picker mechanism of the hand apparatus 6 while the slots 21 in the rear row of the right side cartridge magazine 20 are positioned such that a tape cartridge can be inserted into or taken out of any of them by the picker mechanism of the hand apparatus 6.

In the tape library apparatus 1 described above, since the spaces on the opposite left and right sides of the tape deck 2 can be utilized for accommodation of tape cartridges as seen in FIG. 2, an increased number of cartridges can be accommodated. Further, since a space for accommodating tape cartridges can be provided also on the front and rear sides of the hand apparatus, a tape cartridge can be inserted into or taken out of the tape library apparatus 1 from the front side of the tape library apparatus 1 without taking out the cartridge magazine from the tape library apparatus 1. Consequently, a tape cartridge can be inserted into and taken out of the tape library apparatus 1 readily.

Figure 3:
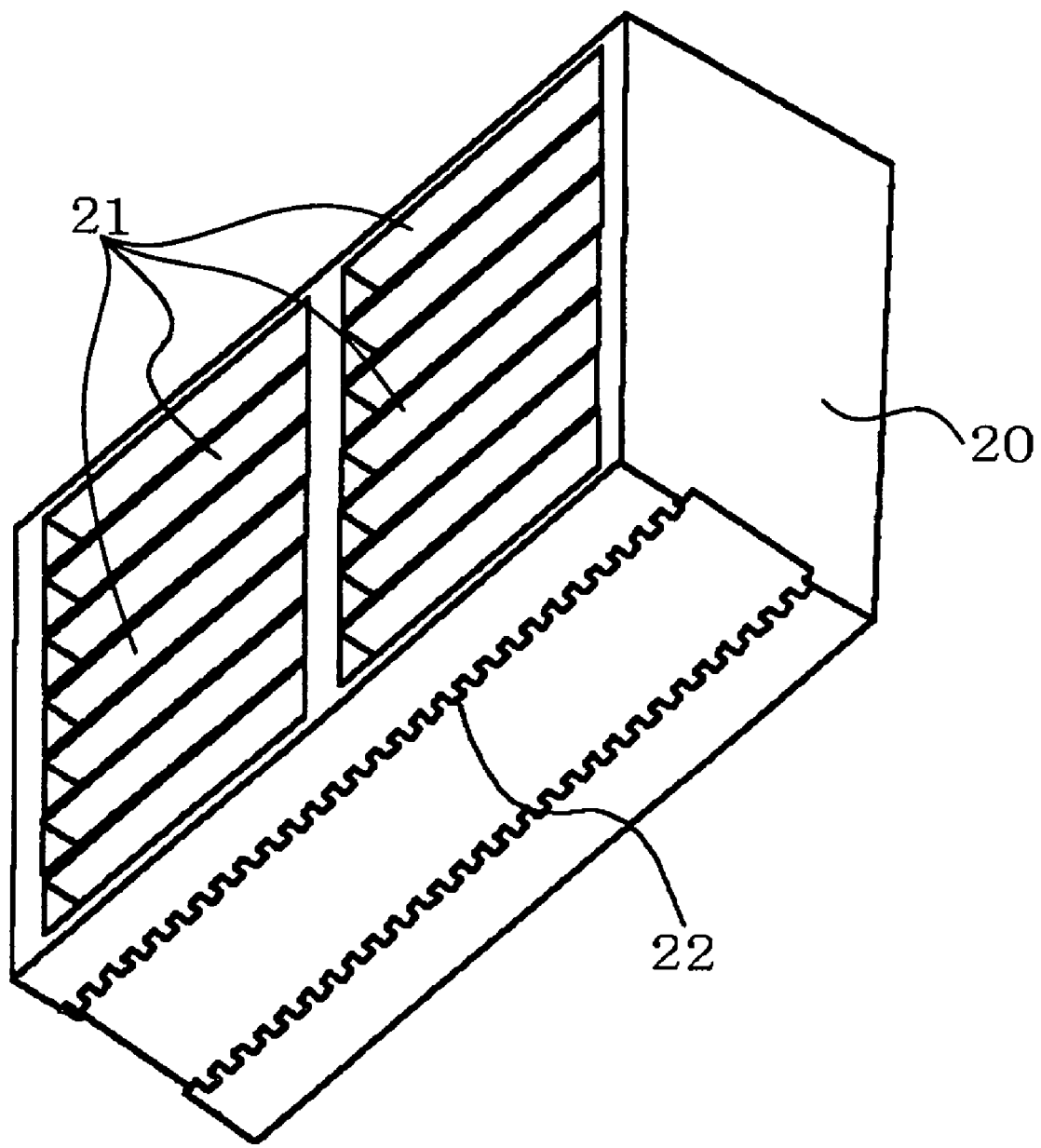
FIG. 3 is a perspective view showing a cartridge magazine used in the tape library apparatus of FIG. 1.
Figure 7:
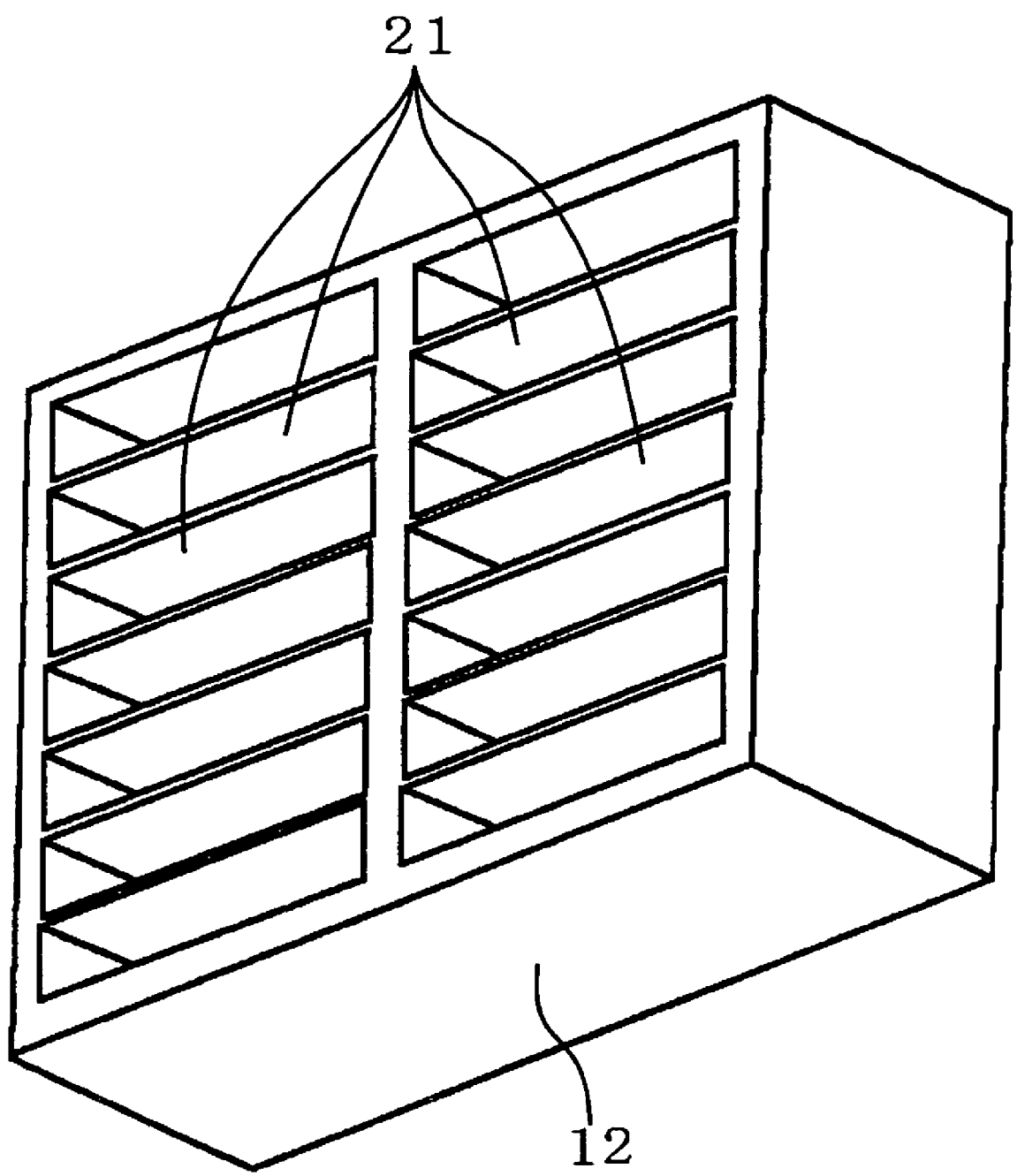
FIG. 7 is a perspective view showing a cartridge magazine of the tape library apparatus of FIG. 6.
Figure 8:
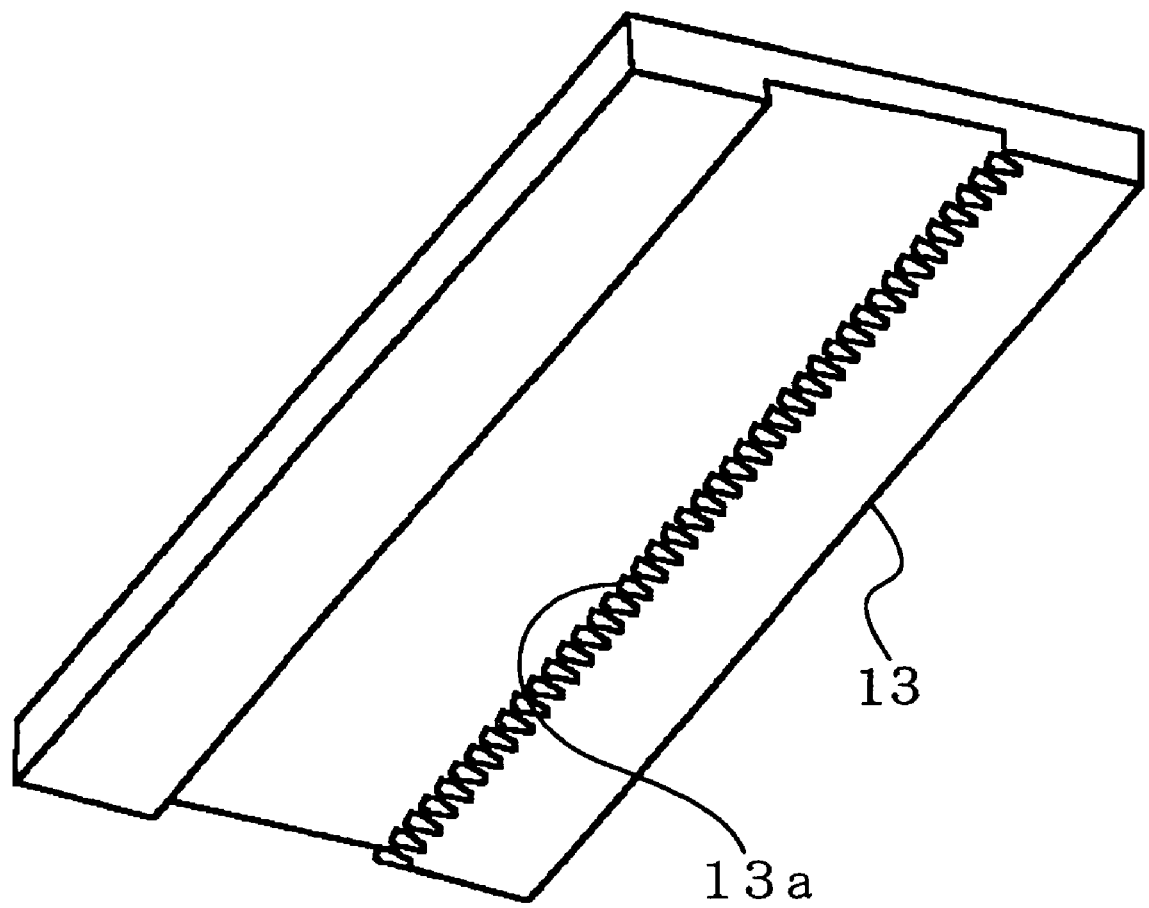
FIG. 8 is a perspective view showing a movable table of the tape library apparatus of FIG. 6.
Figure 9:
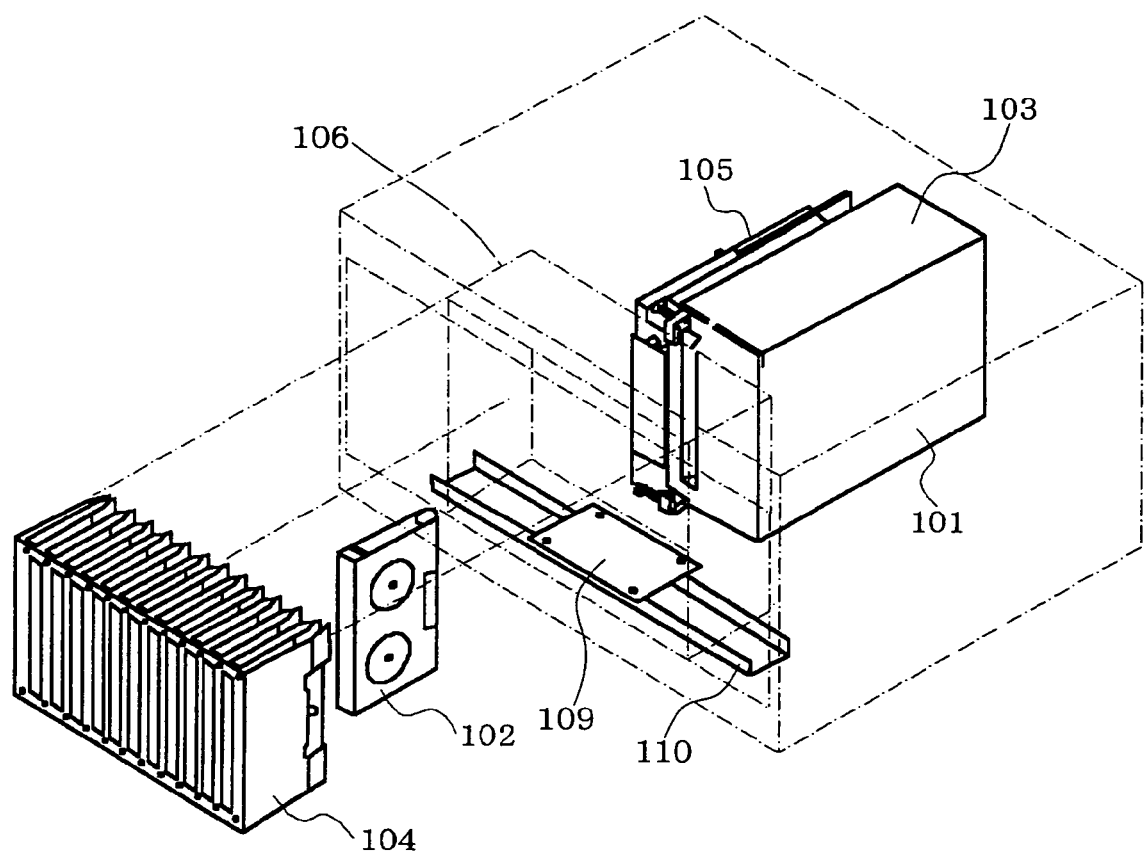
FIG. 9 is a perspective view showing an example of a conventional automatic recording medium loading apparatus.

Now, a modification to the tape library apparatus 1 described above is described. In the tape library apparatus 1 described above, the toothed rack 22 is provided on the lower face of the bottom portion of each of the cartridge magazines 20 as shown in FIG. 3. In the modified tape library apparatus, however, a movable table 13 in the form of a plate is provided for back and forth sliding movement along a pair of rails 7 and a cartridge magazine 12 having no toothed rack thereon as seen in FIG. 7 is placed on the movable table 13. A toothed rack 13a is formed on a lower face of the movable table 13 as shown in FIG. 8 and meshes with the pinion shown in FIG. 5.

With the modified tape library apparatus having the configuration described above, the cartridge magazine can be simplified in shape and produced at a reduced cost. Further, where a toothed rack is provided on the cartridge magazine 20 as shown in FIG. 3, there is the possibility that, when the cartridge magazine 20 is taken out from the apparatus, since the toothed rack 22 provided on the bottom of the cartridge magazine 20 is exposed to the outside, it may interfere with and be damaged by some member. In contrast, where the cartridge magazine and the toothed rack are formed as separate members as in the modified tape library apparatus shown in FIGS. 6 to 8, such otherwise possible damage to the toothed rack can be prevented.

Figure 6:
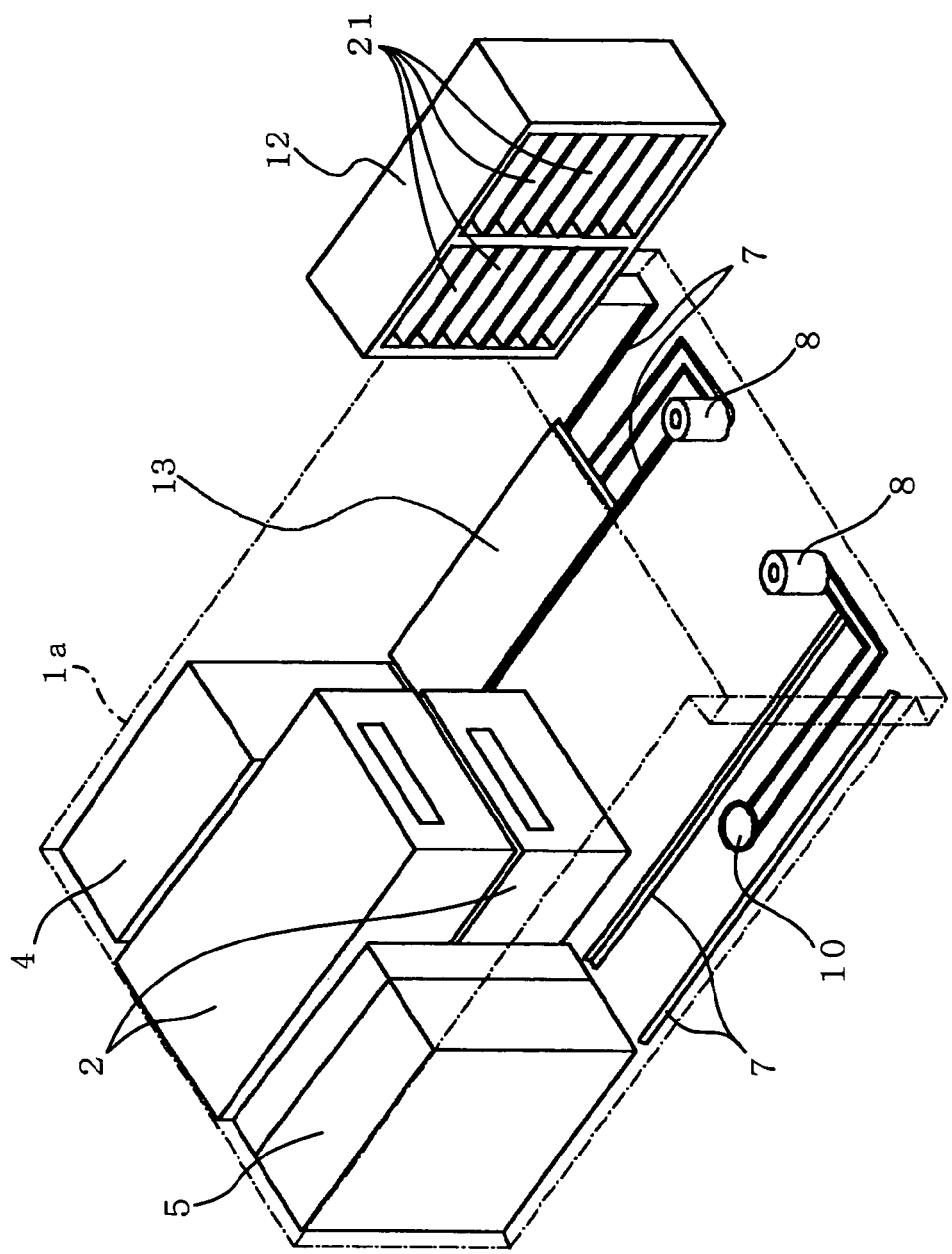
FIG. 6 is a perspective view as viewed from an obliquely upward position of another tape library apparatus which is a modification to the tape library apparatus of FIG. 1.

It is to be noted that, while both of the tape library apparatus 1 and the modified tape library apparatus include a pair of cartridge magazines disposed on the opposite left and right sides of the hand apparatus, it is otherwise possible to provide a cartridge magazine or magazines on only one side of the hand apparatus. Further, if slots of a different size are provided on one of the cartridge magazines or at part of one or both of the cartridge magazines, then cartridges of different sizes can be accommodated in a classified fashion. Further, also where a plurality of tape decks 2 are disposed in a vertically overlapping relationship as seen in FIG. 6, a tape cartridge can be inserted into or taken out from each of the tape decks 2 by the hand apparatus 6.

While a preferred embodiment of the present invention has been described using specific terms, such description is for illustrative purposes only, and it is to be understood that changes and variations may be made without departing from the spirit or scope of the following claims.

What is claimed is:

1. A magnetic tape cartridge library apparatus, comprising:
   a first cartridge magazine for removably accommodating a plurality of magnetic tape cartridges in a plurality of slots in a plurality of stages in a vertical direction;
   a magnetic tape deck for reading or writing data from or onto a magnetic tape cartridge;
   a hand apparatus disposed on a front side of said magnetic tape deck; and
   a magazine feeding mechanism for feeding said first cartridge magazine forwardly or rearwardly on one of left and right sides of said hand apparatus;
   said hand apparatus being operable to insert or take out said magnetic tape cartridge into or from said first cartridge magazine and transport the magnetic tape cartridge between said first cartridge magazine and said magnetic tape deck, and
   wherein said magazine feeding mechanism feeds said first cartridge magazine forwardly or rearwardly along a rail, and
   wherein said magazine feeding mechanism comprises:
   a movable table movable forwardly and rearwardly along said rail with said first cartridge magazine;
   a toothed rack at a bottom portion of said movable table,
   a drive gear for meshing with said toothed rack, and
   a motor for rotating said drive gear,
   wherein at least one of said plurality of slots has a longitudinal axis which is substantially parallel to a longitudinal axis of said rail.

2. The apparatus of claim 1, further comprising:
   a second cartridge magazine; and
   a second magazine feeding mechanism for transporting said a magnetic tape cartridge between said second cartridge magazine and said magnetic tape deck, the first and second cartridge magazines being disposed on opposite left and right sides of said hand apparatus.

3. The apparatus of claim 2, further comprising a third cartridge magazine disposed on a front side of said hand apparatus.

4. The apparatus of claim 1, wherein said plurality of slots is each for removably receiving said magnetic tape cartridge in a horizontal posture, said slots being disposed in a plurality of stages in a vertical direction and in a plurality of rows along a direction which said magazine feeding mechanism feeds said first magnetic cartridge magazine.

5. The apparatus of claim 4, wherein said slots of said first cartridge magazine have a plurality of different sizes.

6. The apparatus of claim 1, wherein said hand apparatus includes a picker apparatus for grasping and removably inserting a magnetic tape cartridge into said first cartridge magazine and loading the magnetic tape cartridge into said magnetic tape deck, a lifter mechanism for moving said picker apparatus upwardly and downwardly, and a swiveling mechanism for changing a direction of the magnetic tape cartridge grasped by said picker apparatus.

7. The apparatus of claim 1, wherein said plurality of magnetic tape cartridges within at least one of said plurality of stages are positioned with respect to each other along a line which is substantially perpendicular to a reference plane that passes through said first cartridge magazine, said magnetic tape deck, and said hand apparatus.

8. The apparatus of claim 7, wherein at least one of said plurality of slots has a longitudinal axis which is substantially parallel to said reference plane.

9. The apparatus of claim 7, wherein said hand apparatus comprises a picker apparatus for grasping and removably inserting a magnetic tape cartridge into one of said plurality of slots and for loading the magnetic tape cartridge into said magnetic tape deck.

10. The apparatus of claim 9, wherein said hand apparatus further comprises a lifter mechanism for moving said picker apparatus in a direction that is substantially parallel to said reference plane.

11. The apparatus of claim 9, wherein said hand apparatus further comprises a swiveling mechanism for changing the direction of the magnetic tape cartridge grasped by said picker apparatus.

12. The apparatus of claim 7, wherein said magazine feeding mechanism feeds said cartridge magazine in a direction that is substantially parallel to said reference plane.

* * * * *